(12) United States Patent  
Tanaka et al.

(10) Patent No.: US 7,620,963 B2
(45) Date of Patent: Nov. 17, 2009

(54) REPRODUCING APPARATUS

(75) Inventors: Takehiko Tanaka, Tokyo (JP);
Keiichiro Uchida, Saitama (JP)

(73) Assignee: Sony Corporation (JP)

( * ) Notice: Subject to any disclaimer, the term of this patent is extended or adjusted under 35 U.S.C. 154(b) by 749 days.

(21) Appl. No.: 10/992,970

(22) Filed: Nov. 18, 2004

(65) Prior Publication Data

US 2005/0117875 A1 Jun. 2, 2005

(30) Foreign Application Priority Data

Nov. 28, 2003 (JP) ............................ P2003-400317

(51) Int. Cl.
*G11B 33/02* (2006.01)
(52) U.S. Cl. ........................................ 720/646; 369/12
(58) Field of Classification Search ................. 369/646, 369/647
See application file for complete search history.

(56) References Cited

U.S. PATENT DOCUMENTS

| 4,743,991 | A | | 5/1988 | Akiyama et al. |
| 5,177,730 | A | * | 1/1993 | Utsugi ........................ 720/646 |
| 5,220,552 | A | * | 6/1993 | Yokoi et al. .................. 720/646 |
| 5,430,553 | A | * | 7/1995 | Misono et al. ............... 386/106 |
| 6,459,169 | B1 | * | 10/2002 | Onodera ..................... 307/10.1 |
| 6,883,759 | B2 | * | 4/2005 | Park et al. .................... 248/27.3 |
| 7,159,226 | B2 | * | 1/2007 | Sasaki et al. ................. 720/646 |
| 7,159,916 | B2 | * | 1/2007 | Stack et al. ................... 296/24.34 |
| 2002/0122370 | A1 | * | 9/2002 | Sasaki et al. ................. 369/75.1 |
| 2003/0103432 | A1 | * | 6/2003 | Nishio et al. ................. 369/75.1 |
| 2003/0161095 | A1 | | 8/2003 | Muroga et al. |
| 2004/0205791 | A1 | * | 10/2004 | Hino ........................... 720/647 |
| 2005/0207311 | A1 | * | 9/2005 | Kobayashi ................... 369/75.11 |
| 2007/0242010 | A1 | * | 10/2007 | Tanaka et al. ................ 345/87 |

FOREIGN PATENT DOCUMENTS

| EP | 0 355 282 A1 | | 2/1990 |
| EP | 355282 A1 | * | 2/1990 |
| JP | 8-172556 A | | 7/1996 |
| JP | 11-250642 A | | 9/1999 |
| JP | 2000-137264 A | | 5/2000 |
| JP | 2002-288971 A | | 10/2002 |

* cited by examiner

*Primary Examiner*—Joseph H Feild
*Assistant Examiner*—Henok G Heyi
(74) *Attorney, Agent, or Firm*—Lerner, David, Littenberg, Krumholz & Mentlik, LLP

(57) ABSTRACT

A reproducing apparatus, in which a disc insertion slot of car audio equipment can be opened and closed by a shutter member to prevent foreign substances, dust and the like from entering the disc insertion slot and in which a liquid crystal display portion is covered with the shutter member to turn off the illumination when driving at night. The reproducing apparatus includes a disc insertion slot in a front panel and a liquid crystal display portion below the disc insertion slot, in which a shutter board for opening and closing the disc insertion slot is provided on the front surface of the front panel and when the disc insertion slot is open, the liquid crystal display portion is covered with the shutter board to turn off the illumination of the liquid crystal display portion.

3 Claims, 6 Drawing Sheets

REPRODUCING APPARATUS

BACKGROUND OF THE INVENTION

1. Field of the Invention

The present invention relates to a reproducing apparatus of in-vehicle audio equipment or the like installed in, for example, an automobile, and particularly to a reproducing apparatus in audio equipment or the like for reproducing a data reproducing medium of such (optical) discs as a CD and a DVD, in which foreign substances, dust and the like are prevented from entering a disc insertion slot by closing the disc insertion slot with a shutter when reproducing a disc or when not reproducing a disc.

2. Description of the Related Art

As a reproducing apparatus of in-vehicle audio equipment or the like described above, various types thereof have been proposed. For example, as one example of a disc reproducing apparatus for such as CDs, DVDs, there is the one in which normally a panel surface of car audio equipment is covered with a liquid crystal display panel and when an eject button is operated to insert or remove a disc, a disc tray is pulled out of a disc reproducing apparatus in conjunction with the operation of turning the liquid crystal display panel.

Further, as another disc reproducing apparatus, there is car audio equipment in which a disc insertion slot and a liquid crystal display positioned below close to the disc insertion slot are integrally installed.

[Patent Literature 1] Japanese Published Patent Application No. H07-50061

[Patent Literature 2] Japanese Published Patent Application No. 2001-352502

However, in the car audio equipment in which a disc insertion slot and a liquid crystal display are integrally installed, since the disc insertion slot is open to be exposed continuously, foreign substances can easily be inserted from the disc insertion slot and also dust or the like easily enters therefrom, which is unfavorable for a reproducing mechanism as well. In addition, the state in which the disc insertion slot is always open is also unfavorable in terms of appearance of car audio equipment.

Also, when an audio disc is reproduced, the title, track number, running time, equalizer curve and the like of the content in reproduction are, for example, displayed on the liquid crystal display; however, the illumination of the liquid crystal display is so bright that drivers driving at night have a problem of distraction.

SUMMARY OF THE INVENTION

In order to resolve the above-mentioned problems and achieve the purpose of the present invention, a reproducing apparatus according to claim 1 of the present invention includes an insertion slot for a data reproducing medium provided in a front panel portion and a display portion provided above or below the insertion slot, in which a shutter member for opening and closing the insertion slot for a data reproducing medium is provided on the front surface of the front panel portion.

A reproducing apparatus according to claim 2 of the present invention is a reproducing apparatus in which a display portion is covered with a shutter member when an insertion slot for a data reproducing medium has been opened.

According to the reproducing apparatus of claim 1 of the present invention, since the disc insertion slot can be closed with the shutter member when reproducing a disc or when not reproducing the disc, foreign substances, dust or the like can be prevented from entering the disc insertion slot, which is favorable for a reproducing mechanism as well. In addition, since the disc insertion slot is covered, the outer appearance becomes also favorable.

According to the reproducing apparatus of claim 2 of the present invention, since the display portion is covered with the shutter member, the brightness of illumination of the display portion is eliminated, so that the problem of distraction for drivers driving at night is resolved. Furthermore, illumination of the display portion covered with the shutter member can be turned off automatically.

DESCRIPTION OF THE PREFERRED EMBODIMENTS

Figure 1:
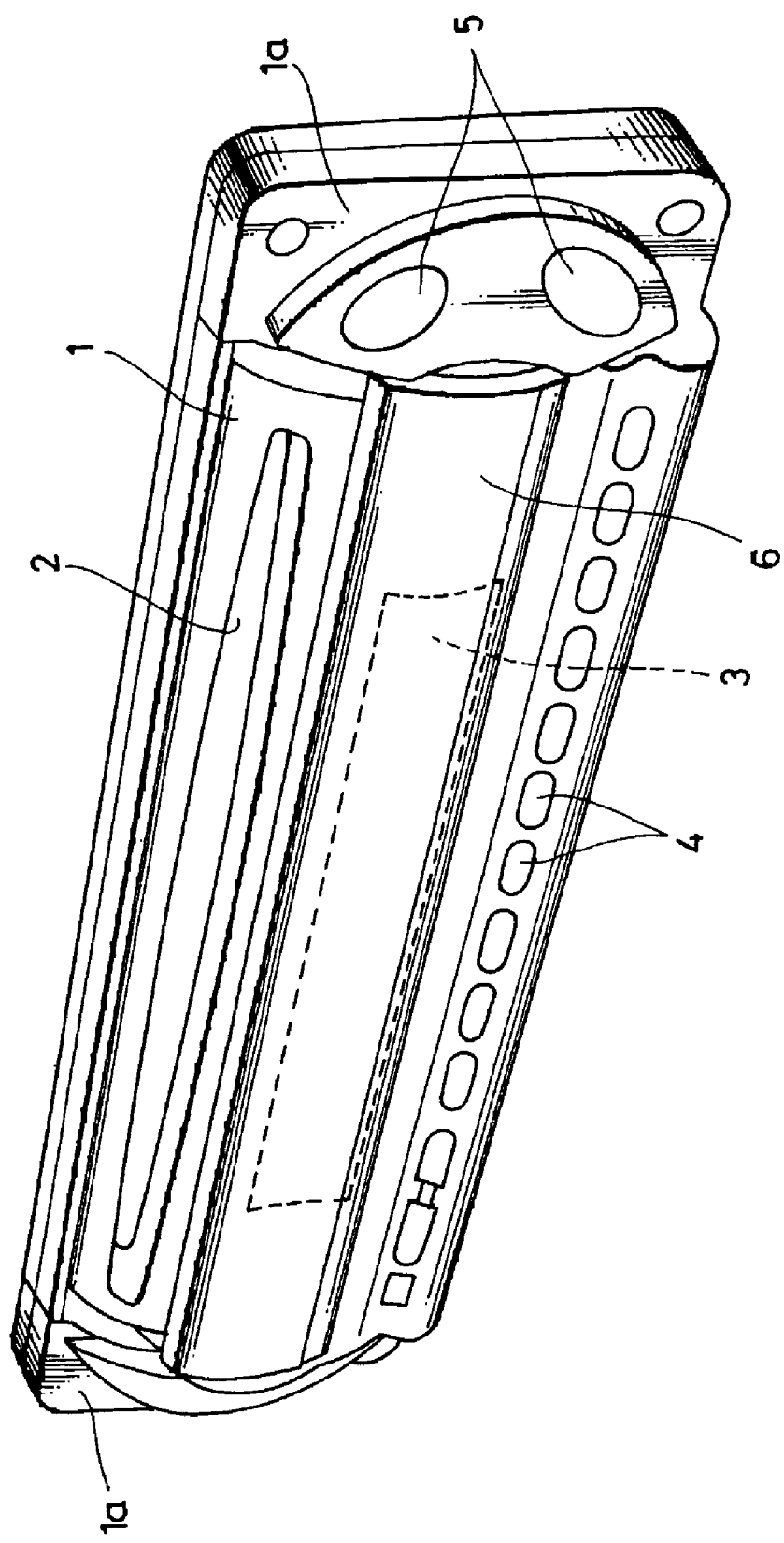
FIG. 1 is an external perspective view showing car audio equipment of an embodiment of a reproducing apparatus according to the present invention, in which a disc insertion slot is exposed and a liquid crystal display portion is covered.

Hereinafter, referring to the drawings, an embodiment of a reproducing apparatus according to the present invention will be explained taking a reproducing apparatus of car audio equipment as an example, in which a data reproducing medium is a disc such as a CD and a DVD.

Figure 2:
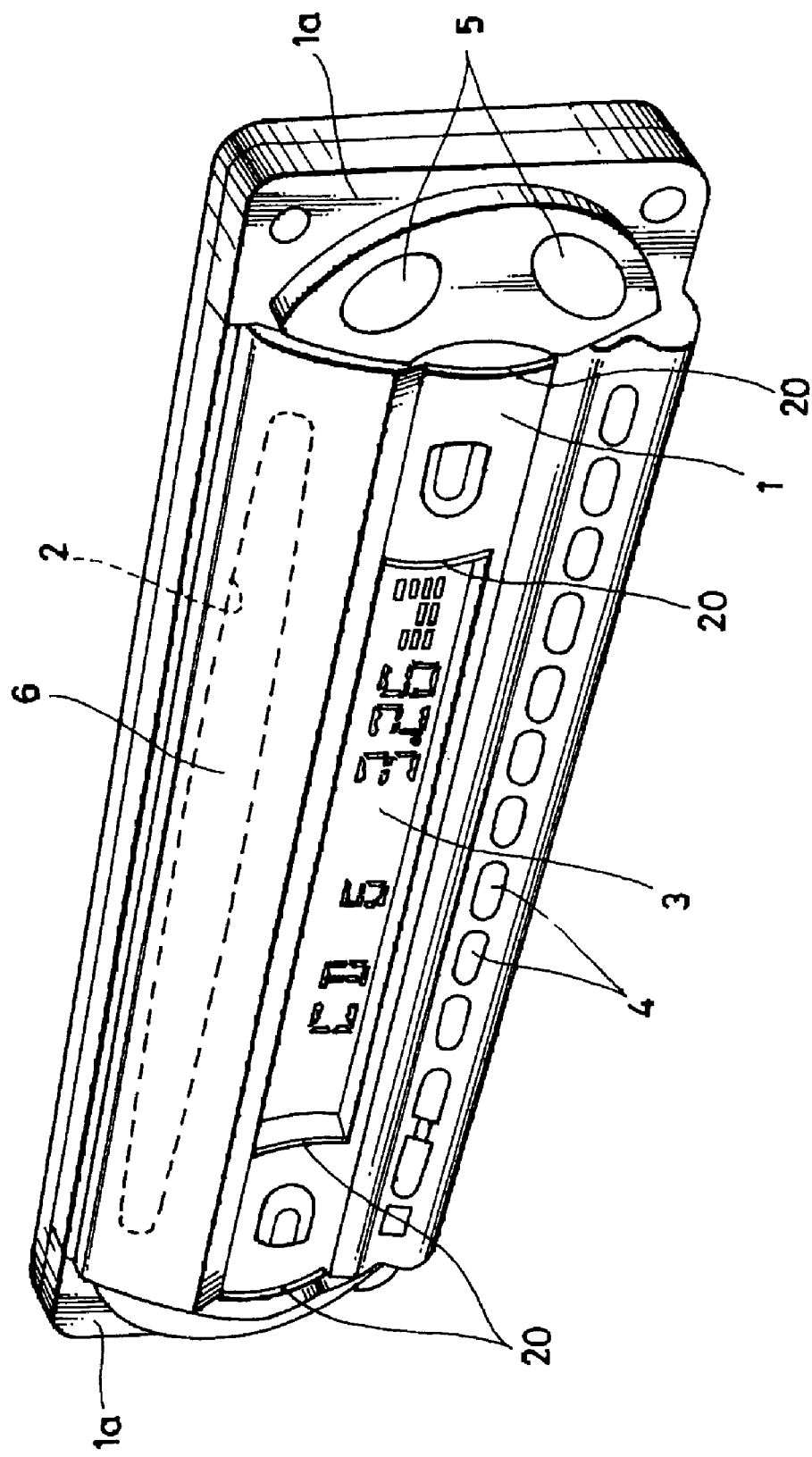
FIG. 2 is an external perspective view showing the car audio equipment of an embodiment of a reproducing apparatus according to the present invention, in which the disc insertion slot is covered and the liquid crystal display portion is exposed.
Figure 3:
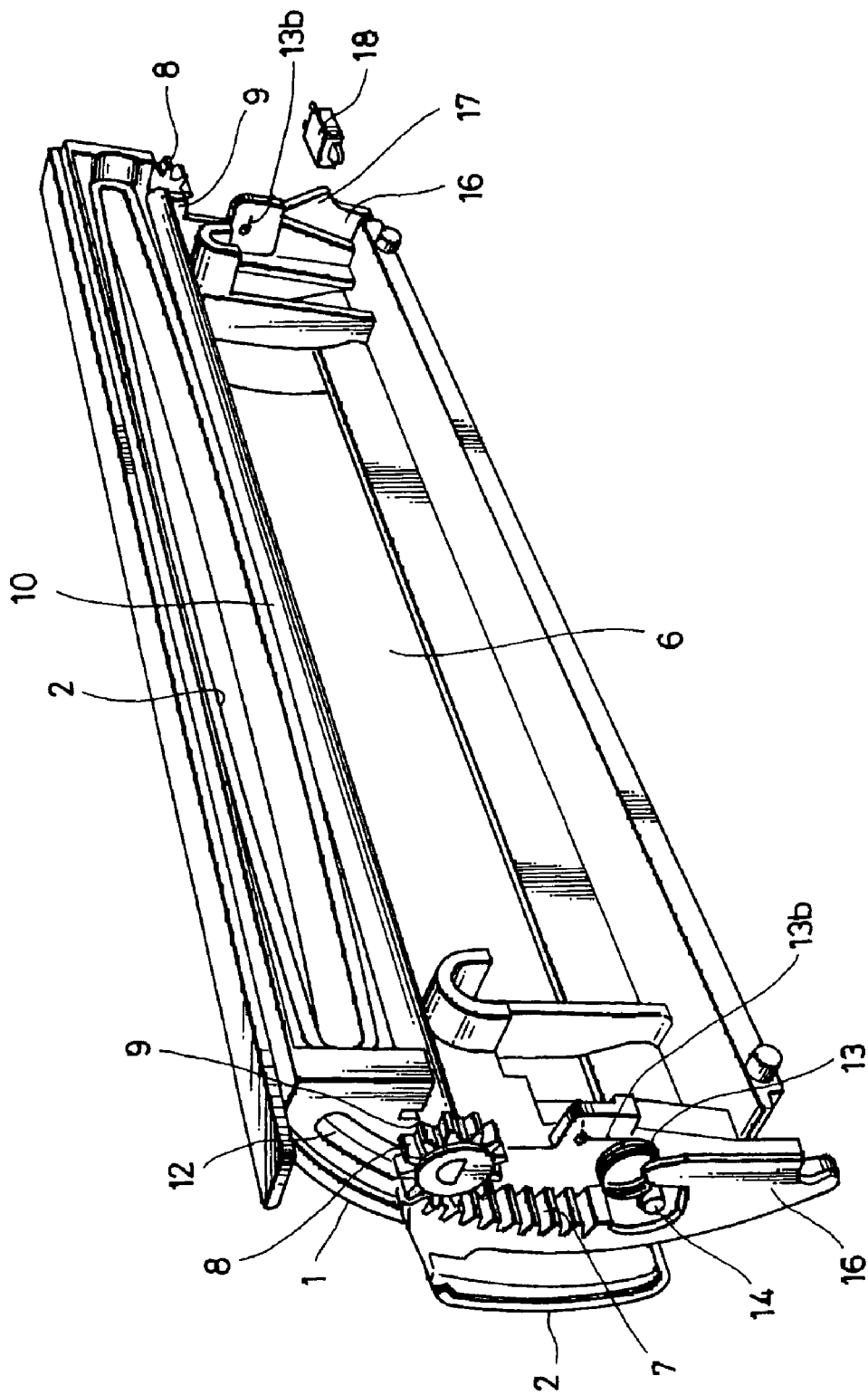
FIG. 3 is an external perspective view showing a shutter moving mechanism from the rear surface side of the front panel.
Figure 4:
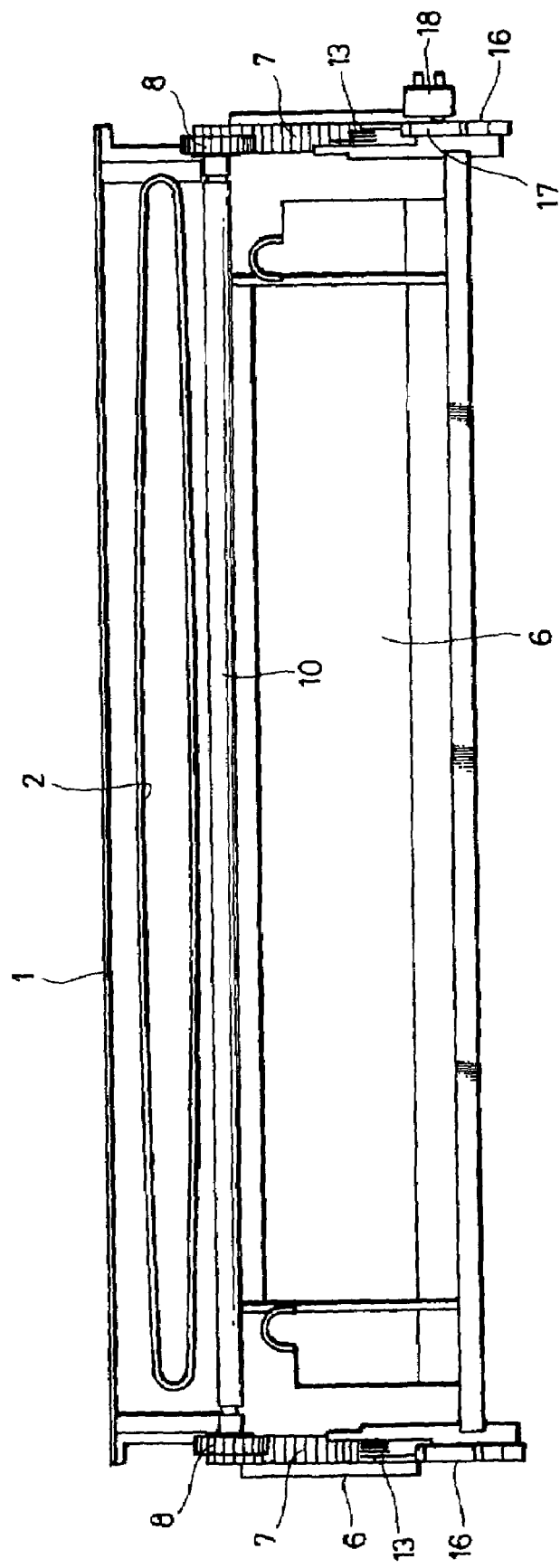
FIG. 4 is a front view showing the shutter moving mechanism from the rear surface side of the front panel.
Figure 5:
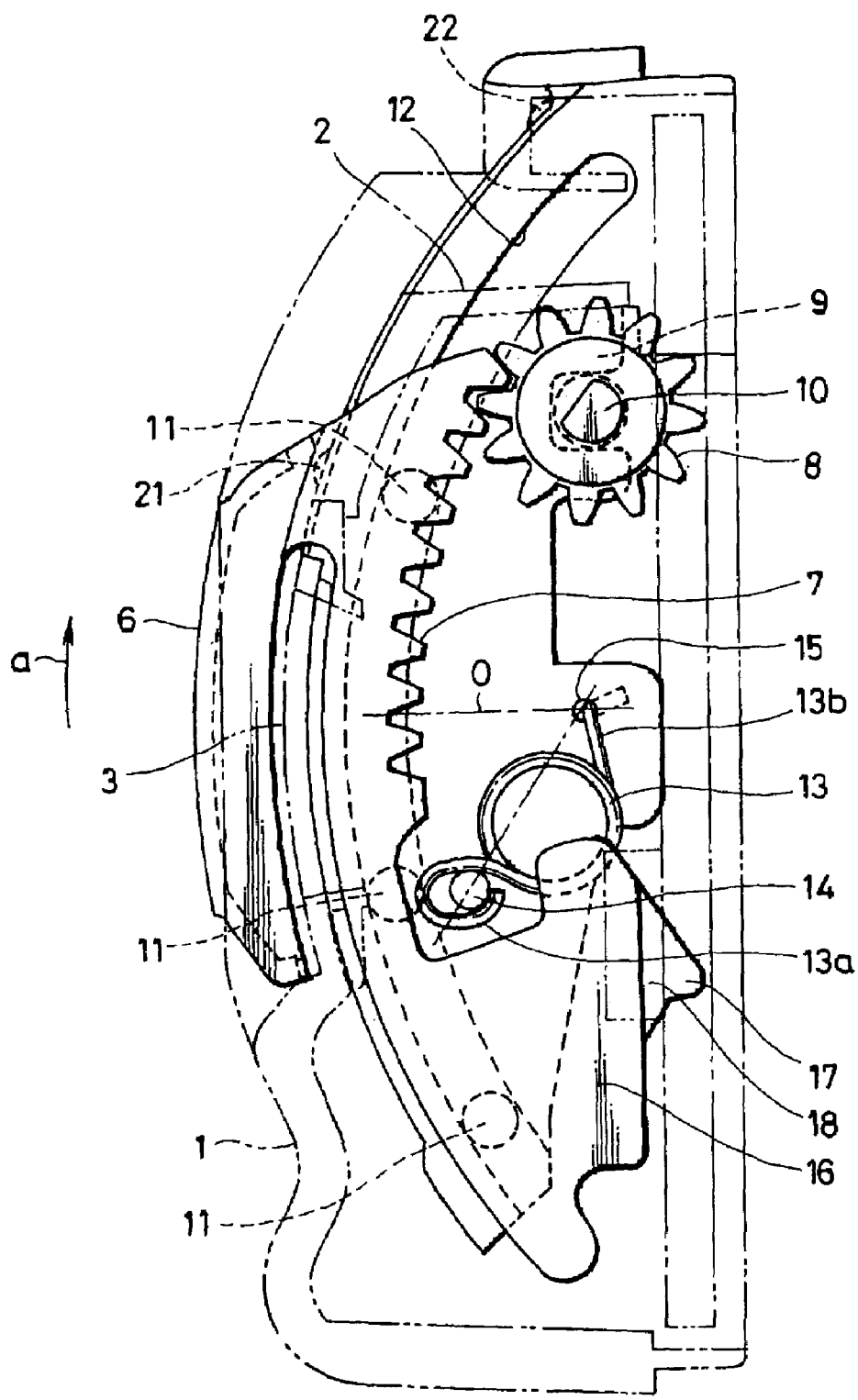
FIG. 5 is a side view of the shutter moving mechanism when the disc insertion slot is exposed.
Figure 6:
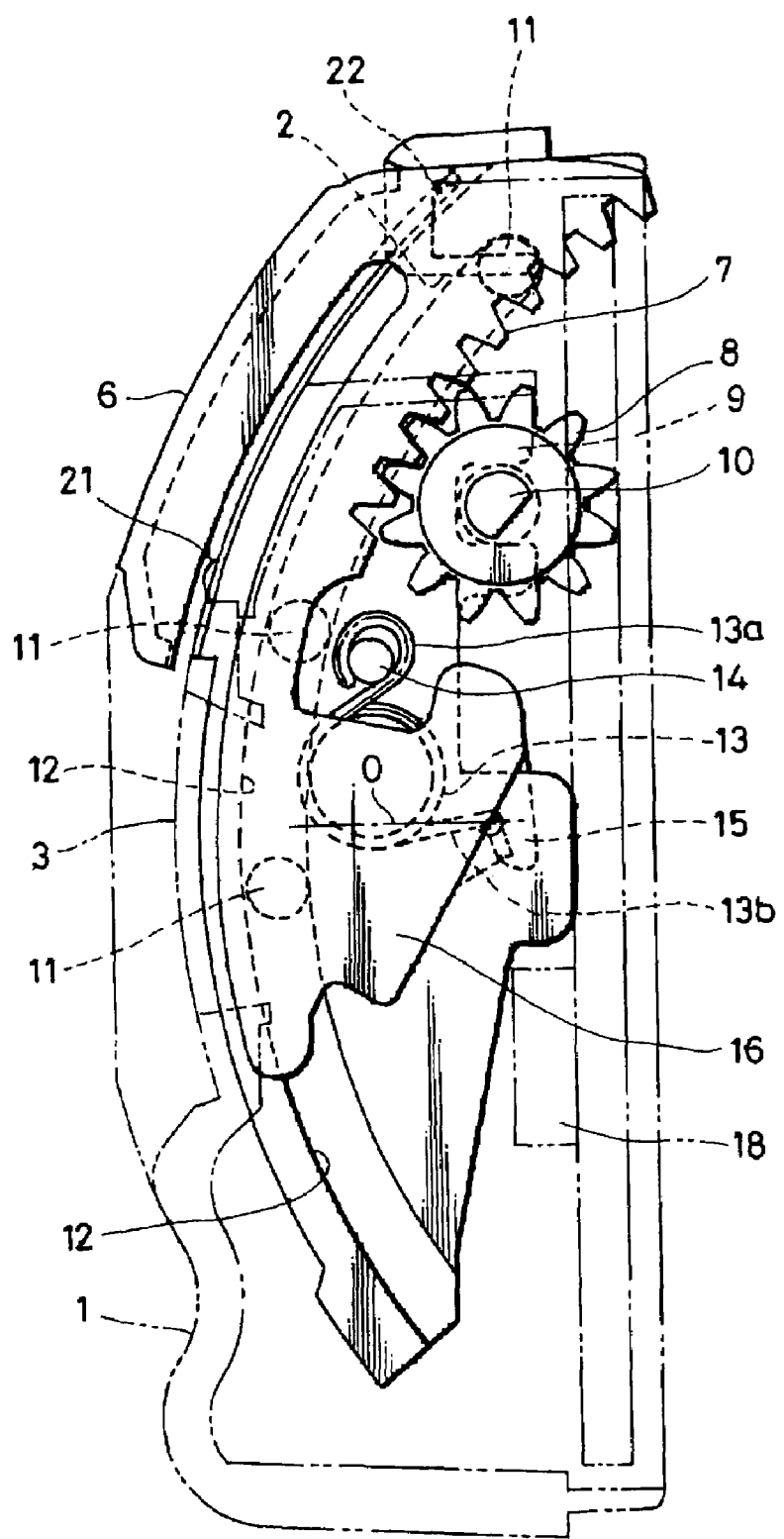
FIG. 6 is a side view of the shutter moving mechanism when the disc insertion slot is closed with a shutter board.

FIG. 1 is an external perspective view showing car audio equipment, in which a disc insertion slot is exposed and a liquid crystal display portion is covered with a shutter board when seen from the front surface side of the front panel; FIG. 2 is an external perspective view showing the car audio equipment in which the disc insertion slot is closed by the shutter board and the liquid crystal display portion is exposed when seen from the front surface side of the front panel; FIG. 3 is an external perspective view showing the shutter moving mechanism when seen from the rear surface side of the front panel; FIG. 4 is a front view showing the shutter moving mechanism when seen from the rear surface side of the front panel; FIG. 5 is a side view of the shutter moving mechanism when the disc insertion slot is exposed; and FIG. 6 is a side view of the shutter moving mechanism when the disc insertion slot is closed with the shutter board.

Numeral 1 denotes a front panel of car audio equipment. As shown in a side view of FIG. 5, the front panel 1 has a surface forming a convex arc shape. At an upper position in the front panel 1 a disc insertion slot 2 is arranged, and at a position below the disc insertion slot 2 and also approximately in the middle of the front panel 1 a liquid crystal display portion 3 is arranged. Further, at a position below the liquid crystal display portion 3 and also at the lower end of the front panel 1 a plurality of operation switch groups 4 are horizontally provided. Further, at the right and left side front surface portions 1a in the front panel 1, operation switches 5 are provided.

On the front surface of the front panel 1 is installed a shutter board 6 which moves between the above-mentioned disc insertion slot 2 and liquid crystal display portion 3 along the convex arc surface of the front panel 1 to perform the opening and closing operation. The shutter board 6 is also shaped like an arc surface along the convex arc surface of the front panel 1 and as shown in FIG. 1 when the shutter board 6 makes the disc insertion slot 2 exposed, the liquid crystal display portion 3 is covered not to be seen, and as shown in FIG. 2, when the disc insertion slot 2 is covered with the shutter board 6, the crystal display portion 3 is exposed to be seen.

Hereupon, the moving mechanism of the shutter board 6 is explained in detail.

On the rear surface of each of the right and left side end portions of the shutter board 6 are integrally formed racks 7 and 7, into which pinions 8 and 8 fit respectively, and both the pinions 8 and 8 are supported by bearings 9 and 9 provided on the rear surface of the front panel 1, and are interconnected by a shaft 10 which traverses the front panel 1.

On the rear surface of the racks 7 and 7, a plurality of (three in this embodiment) guide pins 11 and 11 are provided, and those guide pins 11 and 11 respectively engage with arc-shaped guide grooves 12 and 12 that are formed on the side surfaces of the front panel 1. Accordingly, with respect to the shutter board 6, the guide pins 11 and 11 move along the guide grooves 12 and 12, and concurrently the pinions 8 and 8 roll in synchronization due to the movement of the racks 7 and 7, so that the shutter board 6 can synchronously be moved in parallel with respect to the left and right portions thereof.

Further, with respect to the movement of the shutter board 6, snap operation can be performed with the spring action of toggle springs 13. Specifically, one end 13a of each toggle spring 13 is locked by a lock pin 14 provided on the side surface of the shutter board 6, and the other end 13b is locked by a locking hole 15 formed on the side surface of the front panel 1.

The above-mentioned spring action of the toggle spring 13 is explained in the followings.

FIG. 5 shows the state in which the liquid crystal display portion 3 is covered with the shutter board 6, in other words the state in which the disc insertion slot 2 is exposed. In this state, the spring action of the toggle spring 13 is forced in the direction in which the liquid crystal display portion 3 is covered with the shutter board 6. Hereupon, if the shutter board 6 is moved in the direction shown by an arrow a, that is, in the direction of covering the disc insertion slot 2, the lock pin 14 locking one end 13a of the toggle spring 13 moves together with the shutter board 6, and once the locking pin 14 is past the point of action O, the direction of the spring force of the toggle spring 13 is reversed, so that the shutter board 6 can be forced in the direction of covering the disc insertion slot 2.

Specifically, performing snap action, the shutter board 6 is capable of moving in the direction in which the disc insertion slot 2 is covered and in the direction in which the liquid crystal display portion 3 is covered, according to the spring action of the toggle spring 13 with the point of action O as the dividing point. Further, even if any part of the shutter board 6 is touched to move, the shutter board 6 can be moved smoothly without becoming twisted, because the pinions 8 and 8 which fit into the racks 7 and 7, and the shaft 10 are provided.

Further, ribs 16 and 16 are integrally formed below the racks 7 and 7 in the shutter board 6, and a switch operating piece 17 which turns off the illumination of the liquid crystal display portion 3 is formed in a rib 16 on one side (in the rib 16 on the right-hand side in FIG. 3). Numeral 18 denotes a switch operated by the switch operating piece 17 for turning off the light.

As shown in FIG. 1, when a disc is reproduced in car audio equipment having such construction as described above, the shutter board 6 is moved to the side of the liquid crystal display portion 3 so that the disc insertion slot 2 is exposed and the disc is inserted into the disc insertion slot 2 to be pulled into the audio equipment. Subsequently, as shown in FIG. 2, the disc insertion slot 2 is covered with the shutter board 6, so that the reproduction of the disc starts. Then, such information on the title, track number or others of the content in reproduction is displayed in liquid crystal on the liquid crystal display portion 3.

Accordingly, when a disc is reproduced, the disc insertion slot 2 is covered with the shutter board 6 to be in the closed state; or when a disc is not reproduced, the disc insertion slot 2 may also be covered with the shutter board 6, so that the insertion of foreign substances or entry of dust or the like into the disc insertion slot 2 can be prevented and the inside of the car audio equipment remains in a favorable condition. In addition, covering the insertion slot 2 can improve the outer appearance of the car audio equipment.

On the other hand, when a disc is reproduced, the title, track number and other information on the content are displayed with liquid crystal on the liquid crystal display portion 3; however, this liquid crystal display appears so bright that drivers driving at night may have a problem of distraction. In case of such nighttime driving, the shutter board 6 is moved to the side of the liquid crystal display portion 3 to cover that portion, so that the problem of brightness of the liquid crystal display portion 3 can be eliminated and the driver can concentrate on driving.

Further, according to the embodiment of the present invention, when moving the shutter board 6 to the side of the liquid crystal display portion 3, the switch 18 is operated by the switch operating piece 17 provided in a part of the shutter board 6 and the illumination of the liquid crystal display portion 3 can be turned off; and therefore, no light leaks from gaps of the shutter board 6, thereby making it possible to eradicate the trouble during driving. In this case, a disc can continuously be reproduced without interruption, even in the state where the illumination of the liquid crystal display portion 3 has been turned off. On this occasion, the operation of reproducing the disc can be executed by the group of operation buttons 4 and operation switches 5.

Furthermore, the shutter board 6 moves between the disc insertion slot 2 side and the liquid crystal display portion 3 side along the surface of the front panel 1. Accordingly, in order for the shutter board 6 not to scratch the surface of the front panel 1 on the liquid crystal display portion 3 side, narrow rib-like protrusions 20 are formed on the right and left edges of the liquid crystal display portion 3 and on outer peripheral edges thereof in the direction in which the shutter board 6 moves, as shown in FIG. 2, so that the shutter board 6 moves with the rear surface thereof in contact with the rib-like protrusions 20, which keeps the appearance of the surface of the front panel 1 without scratches.

Furthermore, as a mechanism for not scratching the surface on the disc insertion slot 2 side of the front panel 1, a rib-like protrusion 21 (refer to FIGS. 5 and 6) which crosses horizontally between the disc insertion slot 2 and the liquid crystal display portion 3 is formed, so that when the shutter board 6 closes the disc insertion slot 2, the rear surface of the shutter board 6 moves in contact with the rib-like protrusion 21, which also keeps the appearance of the surface of the front panel 1 without scratches. In addition, when the shutter board 6 has closed the disc insertion slot 2, the rear surface of the upper edge of the shutter board 6 comes over a rib-like protrusion 22, which also keeps the appearance of the surface of the front panel 1 without scratches.

Further, although not shown in the figures, rib-like protrusions are formed on the right and left ends of the disc insertion slot 2 side in the direction in which the shutter board 6 moves, so that the rear surface of the shutter board 6 moves on the rib-like protrusions in contact therewith, which makes it possible to keep the appearance of the surface of the front panel 1 favorably.

The present invention is not limited to the embodiments mentioned above and shown in the figures, and various modifications can be made without departing from the scope of the invention.

With respect to the reproducing apparatus according to the present invention, an example in which the liquid crystal display portion 3 is positioned below the disc insertion slot 2 has been explained as the embodiment; however, the liquid crystal display portion 3 may be positioned above the disc insertion slot 2.

Further, a case in which a CD, DVD or MD is used as a reproducing medium has been explained in the above embodiment of the present invention; however, the present invention can be widely applied to reproducing apparatuses with insertion slots for a cassette tape and the like, needless to say.

Having described preferred embodiments of the invention with reference to the accompanying drawings, it is to be understood that the invention is not limited to those precise embodiments and that various changes and modifications could be effected therein by one skilled in the art without departing from the spirit or scope of the invention as defined in the appended claims.

What is claimed is:

1. A reproducing apparatus comprising:
    an insertion slot for a recording medium provided at a front panel portion,
    a display portion provided at one of above and below the insertion slot,
    a shutter member for opening and closing said insertion slot for the recording medium provided on a front surface of said front panel portion such that when the insertion slot is open the display portion is covered with the shutter member, the shutter member including a switch operating piece for turning off illumination of the display portion when the display portion is covered with the shutter member, and
    at least one rib-like protrusion, included on the front panel portion and protruding in a direction that is substantially perpendicular to both the length and width directions of the display such that it is substantially perpendicular to the face of the display, for contacting the shutter member during opening and closing of the insertion slot.

2. The reproducing apparatus according to claim 1, wherein
    said recording medium is a disc.

3. The reproducing apparatus according to claim 1, further comprising a mounting for securing the apparatus within an automobile.

* * * * *